United States Patent
Ruhlen (10) Patent No.: US 7,376,650 B1
(45) Date of Patent: May 20, 2008

(54) METHOD AND SYSTEM FOR REDIRECTING A REQUEST USING REDIRECTION PATTERNS

(75) Inventor: Matthew Ruhlen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 10/660,899

(22) Filed: Sep. 12, 2003

(51) Int. Cl.
*G06F 7/00* (2006.01)

(52) U.S. Cl. .............. 707/6; 707/2; 707/10; 707/104.1; 709/201; 709/217

(58) Field of Classification Search ............. 707/104.1, 707/2, 10
See application file for complete search history.

(56) References Cited

U.S. PATENT DOCUMENTS 6,542,933 B1 * 4/2003 Durst et al. ................. 709/229
6,654,741 B1 * 11/2003 Cohen et al. ................... 707/6
7,039,722 B1 * 5/2006 Fuisz et al. ................. 709/246
7,130,923 B2 * 10/2006 Mason ........................ 709/245
2004/0205557 A1 * 10/2004 Bahrs et al. ................. 715/513

FOREIGN PATENT DOCUMENTS

EP          1160692 A2 *  12/2001

* cited by examiner

*Primary Examiner*—Hung Q Pham
(74) *Attorney, Agent, or Firm*—Merchant & Gould P.C.; Ryan T. Grace (57) ABSTRACT

Embodiments of the present invention relates to a method, system and computer-readable medium for redirecting a request URL. This redirection includes receiving the request URL from a user. The request URL includes data related to a patterned URL and data related to a destination URL. The patterned URL is determined based on the data related to the patterned URL from the request URL. A destination URL is generated based on one or more of the patterned URL, the data related to the destination URL from the request URL, and redirector configuration information.

39 Claims, 6 Drawing Sheets

METHOD AND SYSTEM FOR REDIRECTING A REQUEST USING REDIRECTION PATTERNS

TECHNICAL FIELD

The invention relates generally to the field of computer networks such as the Internet. More particularly, the invention relates to methods and systems used in the redirection of Uniform Resource Locator (URL) requests.

BACKGROUND OF THE INVENTION

Websites, whether on the Internet, an intranet, or another network, typically contain a collection of resources providing information and services to users. The resources of the website may, for example, be represented by a group of web pages providing these information and services. The information and services may be accessed by a user via a browser using a unique Uniform Resource Locator (URL) for each resource. For a large website, the information and services may be presented by a large number of resources represented by many URLs. These resources may be divided over many machines or servers or logically divided into separate logical entities that have distinct, fully qualified domain names and possibly various directories or other structures within the domains.

Additionally, websites are constantly in flux as information and services are added, deleted, or relocated and the resources are moved within the service between machines, domains or directories. This presents a problem for maintaining links to the actual resources. Websites or software products that contain hard coded links indicating a full, qualified URL must be changed to maintain the links to the resources when the resources are moved. This is especially a problem for a website or software product that is likely to be updated somewhat infrequently.

A particular software product, such as a word processor, may have hard-coded links for help information or for downloads such as templates, clip-art, etc. When a user of the software product selects a hyperlink or other element indicating a URL, the software product launches a browser that retrieves information from the URL hard-coded in the application program. In other cases, the software product such as the word processor may be able to communicate using the Hyper-Text Transfer Protocol (HTTP). In such a case, the software product is able to retrieve the desired information directly, without launching a browser.

However, most software products are updated somewhat infrequently. For example, new versions of applications are updated via service packs or upgrades typically about once per year or even less frequently. New versions of software applications are typically supplied once per 2-3 years. Further, not all users upgrade with each release. So, contents of applications are largely fixed and will stay on a user's machine for long periods of time. However, relocation of the information to which hard-coded hyperlinks within the applications point may occur during the lifetime of the software product. Without an update of the hard-coded URLs in the software product, links to the information and services are broken.

Therefore, many websites and software products use link redirection. To use redirection a web resource or software product includes a hyperlink to a "redirector" which manages the actual location of the requested URL. Once a request for a URL is received by the redirector, the redirector is able to determine the actual final URL. The redirector sends back information repainting the requestor to use the correct URL. The browser or software product then sends another request for the correct URL using the received URL from the redirector.

Two types of redirector systems have been commonly used. One approach uses a database containing all possible redirect information indicating all varieties of locations for resources on the website or service. The database is then processed to produce a collection of code-scripted pages containing all the redirect data. These pages are then placed on the web site. A request for a URL from a user causes execution of code by the redirector to determine the correct URL from the URL list and return this result to the user in a redirection request.

Another common approach is to maintain a Structured Query Language (SQL) database with a record for each possible link and forcing every possible combination of desired parameters for that redirect to be maintained and queried against. This approach also utilizes a database of all possible redirect information indicating all varieties of locations for resources on the website or service. The redirector, upon receiving a request URL, executes code to construct and send a query to the database to retrieve results indicating the destination URL.

However, these systems suffers from a slow response resulting in a low number of transactions per second due to the need to search a potentially very large URL list or database for each request. In addition to poor performance, systems that utilize code to search a list of redirects are also hard to maintain since new code must be produced every time a URL changes. It is with respect to these and other considerations that the present invention has been made.

SUMMARY OF THE INVENTION

In accordance with the present invention, the above and other problems are solved by redirection patterns for redirecting a request Uniform Resource Locator (URL). That is, a redirection pattern in a patterned URL is used, together with information in a request URL, and in some cases configuration information on the redirector itself, to determine a destination URL.

In accordance with other aspects, the present invention relates to a method of redirecting a request URL. This method includes receiving the request URL from a user. The request URL includes data related to a patterned URL and data related to a destination URL. The patterned URL is determined based on the data related to the patterned URL from the request URL. A destination URL is generated based on one or more of the patterned URL, the data related to the destination URL from the request URL, and redirector configuration information.

In accordance with still other aspects, the present invention relates to a system for redirecting a request URL. The system comprises a processor and a memory coupled with and readable by the processor. The memory has stored therein instructions which, when executed by the processor, cause the processor to receive a request URL comprising data related to a patterned URL and data related to a destination URL, determine the patterned URL based on the data related to the patterned URL from the request URL, and generate a destination URL based on one or more of the patterned URL, the data related to the destination URL from the request URL, and redirector configuration information.

The invention may be implemented as a computer process, a computing system or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Before describing various embodiments of the present invention, some terms that will be used throughout this description will be defined.

A "redirect request" is a request made by the redirector to a browser or other application program in response to a request URL. The redirect request may include a destination URL.

A "request URL" is the item passed to the redirector by the browser or other application program requesting information from a website service. According to one embodiment of the present invention, the request URL contains data used by the redirector to determine the desired patterned URL and the destination URL. It may also contain additional pattern data to be used by the redirector. An example request URL may be: http://r.office.net/r/rlidMSHome.

A "patterned URL" is a URL that the redirector associates with a request URL and then processes to determine the destination URL to which the request should be redirected.

A "destination URL" is a URL sent back to the browser or other application program that sent the request URL. The destination URL points the requester to the final location of the desired content.

A "pattern" is a specific set of characters that are interpreted by the redirector in the context of a request URL and then used to produce a new set of characters to be included within the destination URL.

A "website service" is a coherent set of web resources (http addressable content or code) that work together to provide a group of related content. For example, a help service may include a set of web pages or other resources providing help information and technical support for a particular software product.

Figure 1:
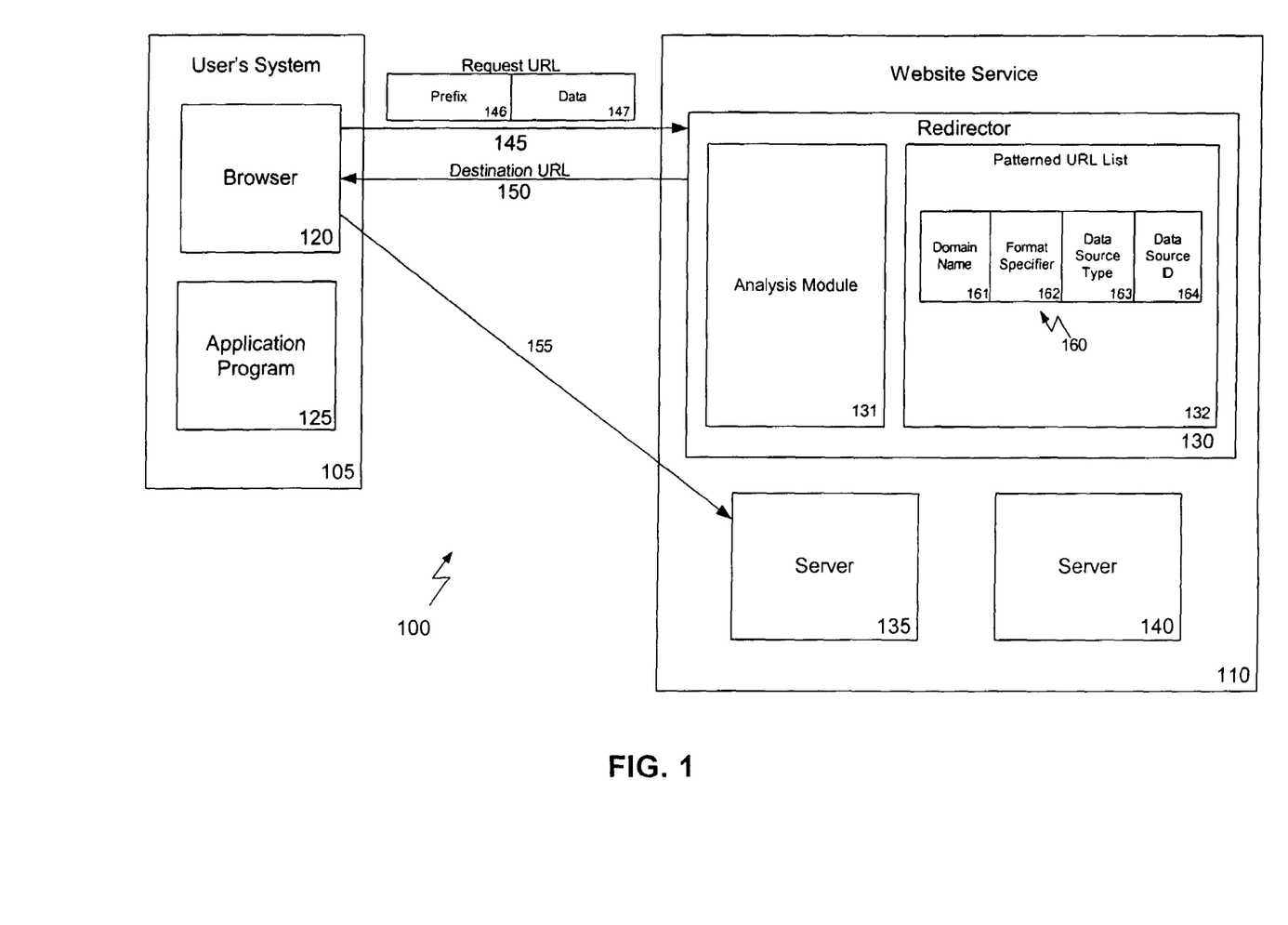
FIG. 1 illustrates at a high level the main functional components of a system for redirecting a request URL according to one embodiment of the present invention.

FIG. 1 illustrates the main functional components of a system for redirecting a request URL according to one embodiment of the present invention. This system 100 includes a user's system 105 that executes a browser 120 and one or more application programs 125 such as a word processor, spreadsheet, email, etc. Also shown is a website service 110 connected with the user's system via a network such as the Internet or other network. This website service 110 may represent any one of a number of possible website based services. The website service 110 includes a redirector 130 and one or more servers 135 and 140. While two servers 135 and 140 are illustrated here, any number of servers may be present. In other embodiments functions of the redirector 130 and servers 135 and 140 may be performed by one machine.

A user, while executing an application program 125 on the user's system 105, may select an element displayed on a user interface, click on a hyperlink embedded in a document, or in another way trigger the application program 125 to request information that is located on the website service 110. The hyperlink or other element is associated with a hard-coded URL that is, in some cases, passed to the browser 120 that is launched by the application program 125. The hard-coded URL passed to the browser 120 points to the redirector 130. The browser 120 in turn sends this request URL 145 to the redirector 130 via the Internet or other network. In other cases, the application program 125 may be able to communicate using HTTP protocol. In this case, there is no need to launch the browser 120 since the application 125 is able to communicate directly with the redirector 130.

The request URL 145 has two main parts 146 and 147. A first part is a standard set of characters representing a prefix. In some cases, the prefix points to the redirector 130. For example, a request URL 145 may have a prefix 146 such as "http://r.office.microsoft.com/r/" indicating a redirector. The second part of the request URL 145 is data 147 to the redirector 130. This data 147 can be any of a variety of possible information. For example, it can be path separated information such as / . . . / . . . / . . . / or other information passed to the redirector like query information. As will be described below, the data 147 is used, together with the patterned URL to generate the destination URL.

The redirector 130 receives the request URL 145 and performs functions described in detail below to redirect the request URL to an appropriate destination URL. Briefly, the redirector 130, in response to receiving the request URL 145 (1) determines a patterned URL 160 based on the request URL 145, (2) determines a destination URL 150 based on one or more of the request URL 145, the patterned URL 160, and configuration information from the redirector 130 and (3) returns that destination URL 150 to the browser 120 or other application program 125 on the user's system 105 with a redirection request. The browser 120 or other application program 125 may then use the destination URL 150 to request 155 the desired information from the appropriate location. In many cases the destination URL 150 indicates a location on one of the servers 135 or 140 of the website service 110. However, in some cases the destination URL 150 may alternatively indicate another server at another location.

More specifically, the redirector 130 has an analysis module 131 and a patterned URL list 132. The analysis module 131 parses the request URL 145 into the separate prefix part 146 and data part 147. The analysis module 131 then uses the prefix 146 from the request URL 145 to look up a corresponding patterned URL from the patterned URL list 132.

A patterned URL 160 in the patterned URL list 132 may represent a portion of a destination URL that is relatively common in the website service such as a domain name 161 along with formatting information or other data Formatting information in the patterned ULR 160 may include a format specifier 162 a data source type 163, and a data source identifier 164. Details of this formatting information and how it is used will be discussed below with reference to FIGS. 3-6.

Use of patterned URLs may be especially useful, for example, in website services that have a common structure for information in multiple languages. That is, a website service may offer information in multiple languages where each language is represented as a subdirectory of a common parent directory. In such a case, the destination URL for information in English may be "http://office.microsoft.com/home.aspx." The corresponding Japanese language resource may be "http://office.microsoft.com/ja-jp/home.aspx." Additionally, all of the subdirectories and resources in the different languages may follow the same structure including subdirectory names and file names. So, the only difference between the destination URLs for corresponding information in different languages would be the part that indicates the subdirectory for the language. Therefore, the patterned URL 160 can be used to indicate the common parts of the destination URL 150 such as the domain name "http://office.microsoft.com/" and indicate how to format the remaining part based on information supplied by the request URL 145.

After locating an appropriate patterned URL 160 in the patterned URL list 132, the analysis module 131 generates a destination URL 150 based on one or more of the patterned URL 160, the data 147 from the request URL 145, and configuration data from the redirector. Configuration data from the redirector may include but is not limited to information used to map the services of the website to one or more servers.

For example, a patterned URL 160 may indicate a common domain such as "http://office.microsoft.com/" and indicate formatting for a language indicated in the request URL 145. Using the language information from the request URL 145 and the formatting indicated in the patterned URL 160, a destination URL 150 such as "http://office.microsoft.com/ja-jp/home.aspx" can be generated.

Therefore, there is no need to search a list of all possible destination URLs or query a database containing all possible destination URLs. Rather, a relatively short list of patterned URLs will be searched and a destination URL will be generated based data from the request URL, the patterned URL, and possibly the redirector configuration. Additional details of generating the destination URL will be discussed below with reference to FIGS. 3-6.

Figure 2:
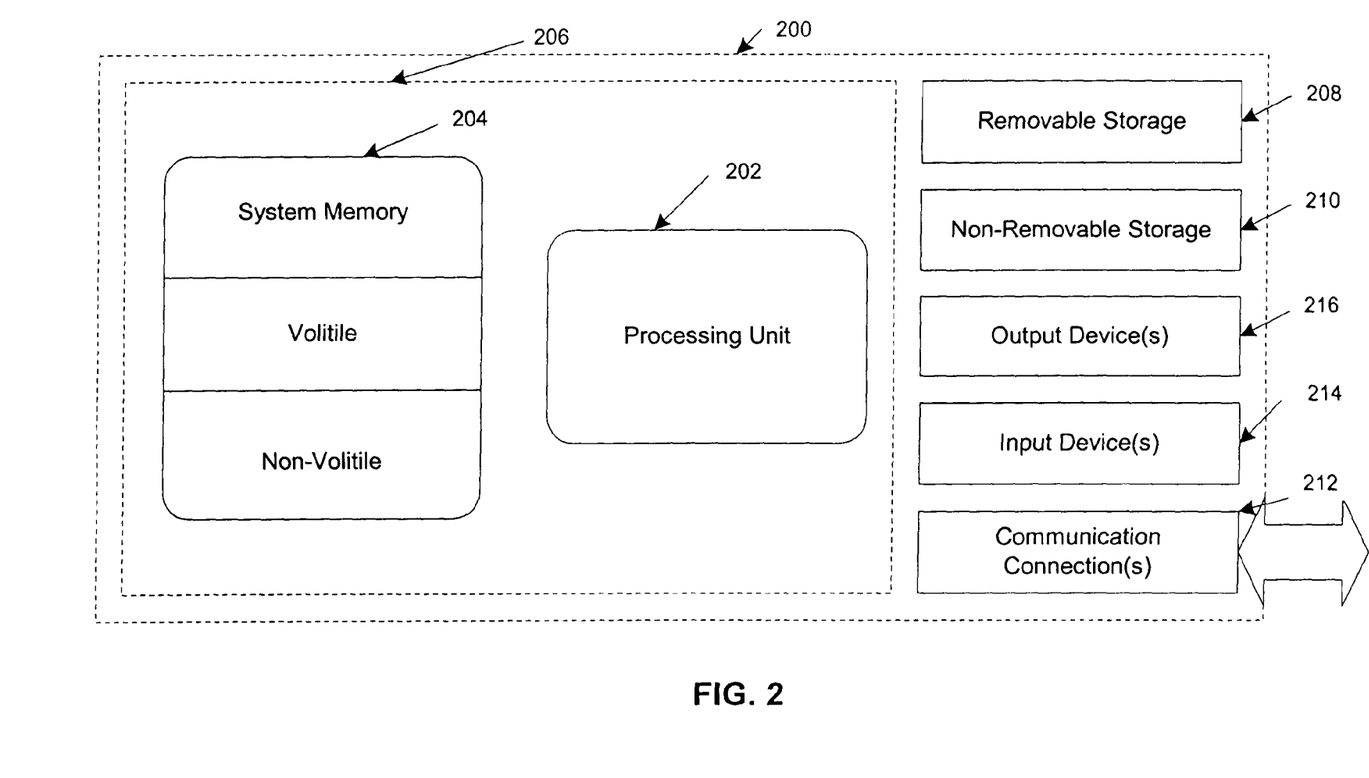
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to serve as a redirector and/or servers in a website service. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof.

Figure 3:
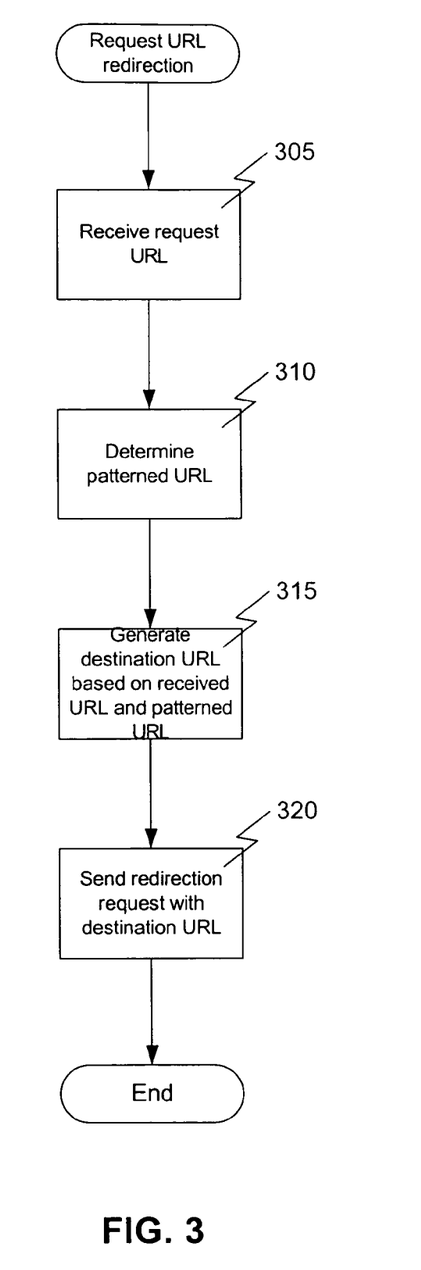
FIG. 3 illustrates redirecting a request URL according to one embodiment of the present invention.

FIG. 3 illustrates redirecting a request URL according to one embodiment of the present invention. According to this embodiment, operation begins with receive operation 305. Receive operation 305 receives a request URL comprising data related to a patterned URL and data related to a destination URL. As discussed above, the request URL has two parts. The first part, the prefix, may indicate an address of the redirector. The second part includes data that may be used by the redirector to determine a destination URL.

Next, determination operation 310 determines the patterned URL based on the data related to the patterned URL from the request URL. Generally, this function may be performed by looking up a patterned URL from a list or database of patterned URLs. The patterned URL may contain a prefix and one or more patterns. Each pattern may be identified by special characters. For example, the pattern may be enclosed within the "[" and "]" or other characters. The body of a pattern, between the special characters, has three parts: a format specifier, a data source type, and a data source identifier. Thus, in one embodiment, a pattern looks like: [<format specifier><data source type><data source id>].

Control then passes to generation operation 315. Generation operation 315 generates a destination URL based on one or more of the patterned URL, the data related to the destination URL from the request URL, and redirector configuration information. As will be described further below with reference to FIG. 4, generation of the destination URL comprises parsing the patterned URL, copying non-patterned characters from the patterned URL to the destination URL, interpreting patterned characters in the patterned URL, and writing to the destination URL based on the interpreted characters.

Once the destination URL is generated, control passes to send operation 320. Send operation 320 comprises sending a redirection request with the destination URL to the browser or other application that sent the request URL. The browser or other application program may then send another request using the destination URL.

Figure 4:
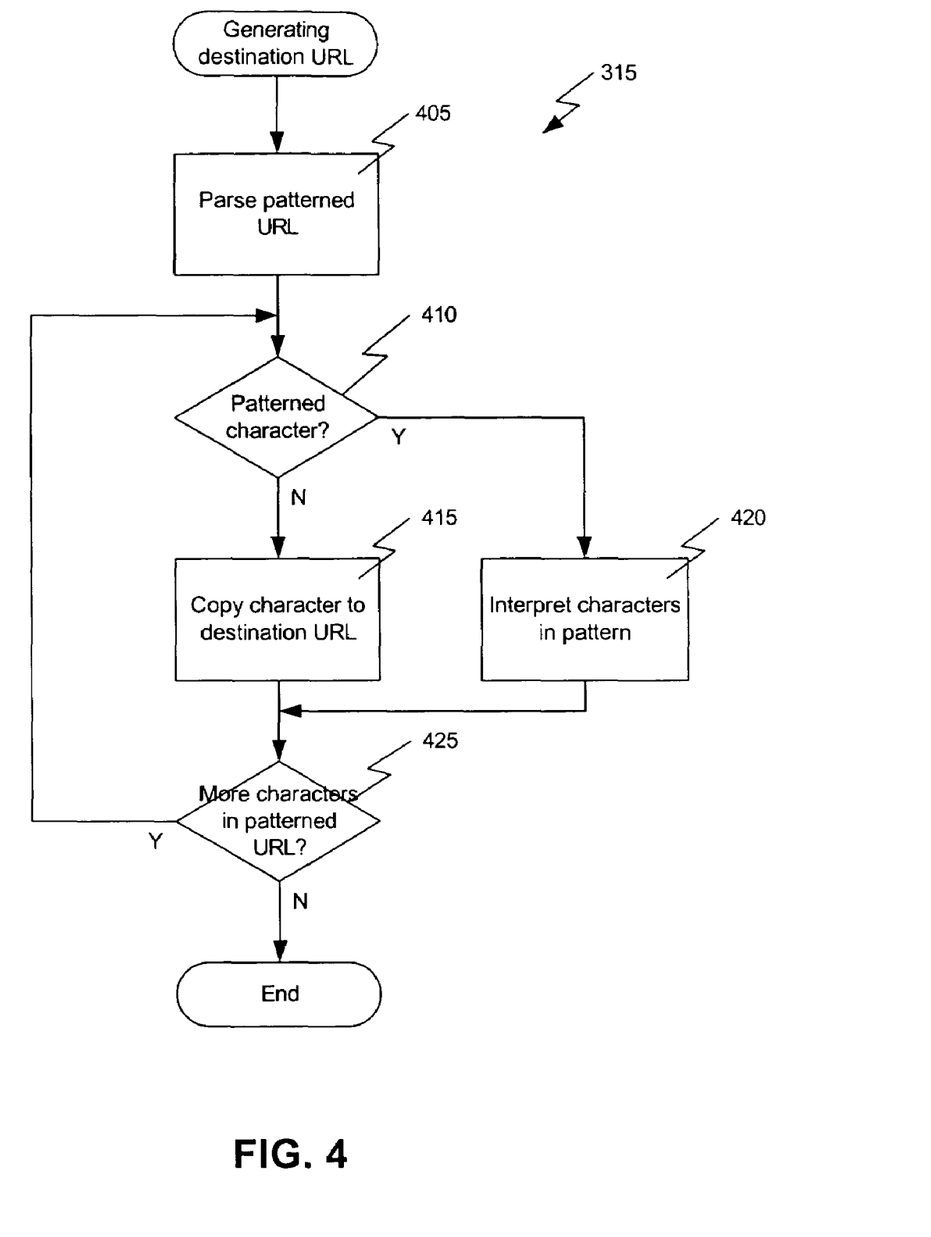
FIG. 4 illustrates generating a destination URL according to one embodiment of the present invention.

FIG. 4 illustrates generating a destination URL according to one embodiment of the present invention. First, parse operation 405 parses the patterned URL. That is, the patterned URL may be parsed to identify patterns indicated by special characters such as "[" and "]" or others as discussed above.

Next, control passes to query operation 410. Query operation 410 comprises determining whether a character read from the patterned URL is a patterned character. That is, a determination is made as to whether a current character of the patterned URL indicates a pattern including a format specifier, a data source type, and/or a data source identifier. If, at query operation 410, a determination is made that the character is not a patterned character, control passes to copy operation 415. Copy operation 415 then copies the non-patterned characters from the patterned URL to the destination URL. That is, for non-patterned characters, no processing is performed other than copying the character to the destination URL.

If, at query operation 410, a determination is made that the character is a patterned character, control passes to interpret operation 420. Interpret operation 420 comprises interpreting the characters of the detected pattern in the patterned URL based on the data source type and the format specifier. Details of interpreting the pattern based on the data source type and the format specifier will be discussed below with reference to FIGS. 5 and 6.

Finally, query operation 425 determines whether more characters remain in the patterned URL. If more characters remain to be processed, control returns to query operation 410 where the next character is checked. That is, characters from the patterned URL will continue to be copied to the destination URL or interpreted until all characters from the patterned URL have been processed.

Figure 5:
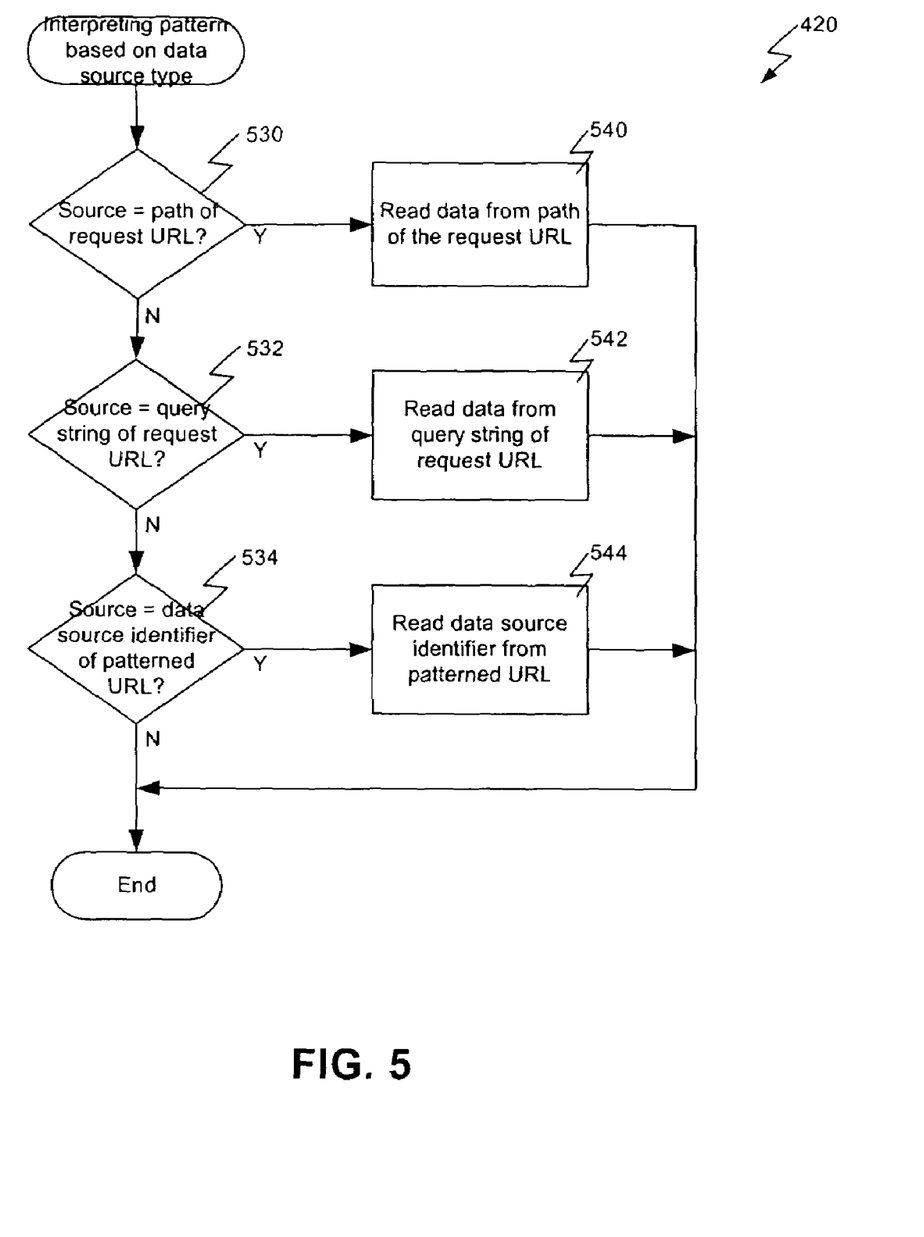
FIG. 5 illustrates interpreting a pattern from a patterned URL based on a data source type according to one embodiment of the present invention.

FIG. 5 illustrates interpreting a pattern from a patterned URL based on a data source type according to one embodiment of the present invention. Examples of possible data source types are listed below for illustrative purposes only. Other symbols or characters may be used for the data source types. Additionally, further types may be added in other embodiments. Some examples of possible data source types and their meanings include:

| | |
|---|---|
| / | Indicates that the data is found in the path portion of the request URL, in which case the data source identifier identifies the number of the path part. |
| = | Indicates that the data is found on the query string of the request URL, in which case the data source identifier identifies the query string variable name. |
| ' | Indicates the data source identifier is the literal data and not an identifier. |

In the example illustrated in FIG. 5, control passes through a series of query operations 530, 532, and 534. These query operations 530, 532, and 534 cause control to branch depending upon the data source type.

First, query operation 530 makes a determination as to whether the data source type indicates that data is located in a path portion of the request URL. If, at query operation 504 a determination is made that the data source type indicates the path portion of the request URL, control passes to read operation 540. Read operation 540 comprises reading a path part from the request URL. The path part may identified by the data source identifier in the pattern. If, at query operation 530, the data source type does not indicate the path portion of the request URL, control passes to query operation 532.

Query operation 532 makes a determination as to whether the data source type indicates that data is located in a query string of the request URL. If, at query operation 532 a determination is made that the data source type indicates the query string of the request URL, control passes to read operation 542. Read operation 542 comprises reading data from the query string of the request URL. The query string may be identified by the data source identifier in the pattern. If, at query operation 532, the data source type does not indicate the query string of the request URL, control passes to query operation 534.

Query operation 534 makes a determination as to whether the data source type indicates that data is located in a data source identifier of the patterned URL. If, at query operation 534 a determination is made that the data source type indicates the data source identifier of the patterned URL, control passes to read operation 544. Read operation 544 comprises reading the data source identifier from the patterned URL.

Therefore, the data source identifier of the pattern from the patterned URL indicates a location of data to be used for generating the destination URL. Interpreting the pattern includes reading the data indicated by the data source identifier. Then, using this data, the destination URL may be written based on the format specifier of the pattern. In other words, interpreting the pattern of the patterned URL comprises reading data indicated by the data source type and writing to the destination URL based on the format specifier.

Figure 6:
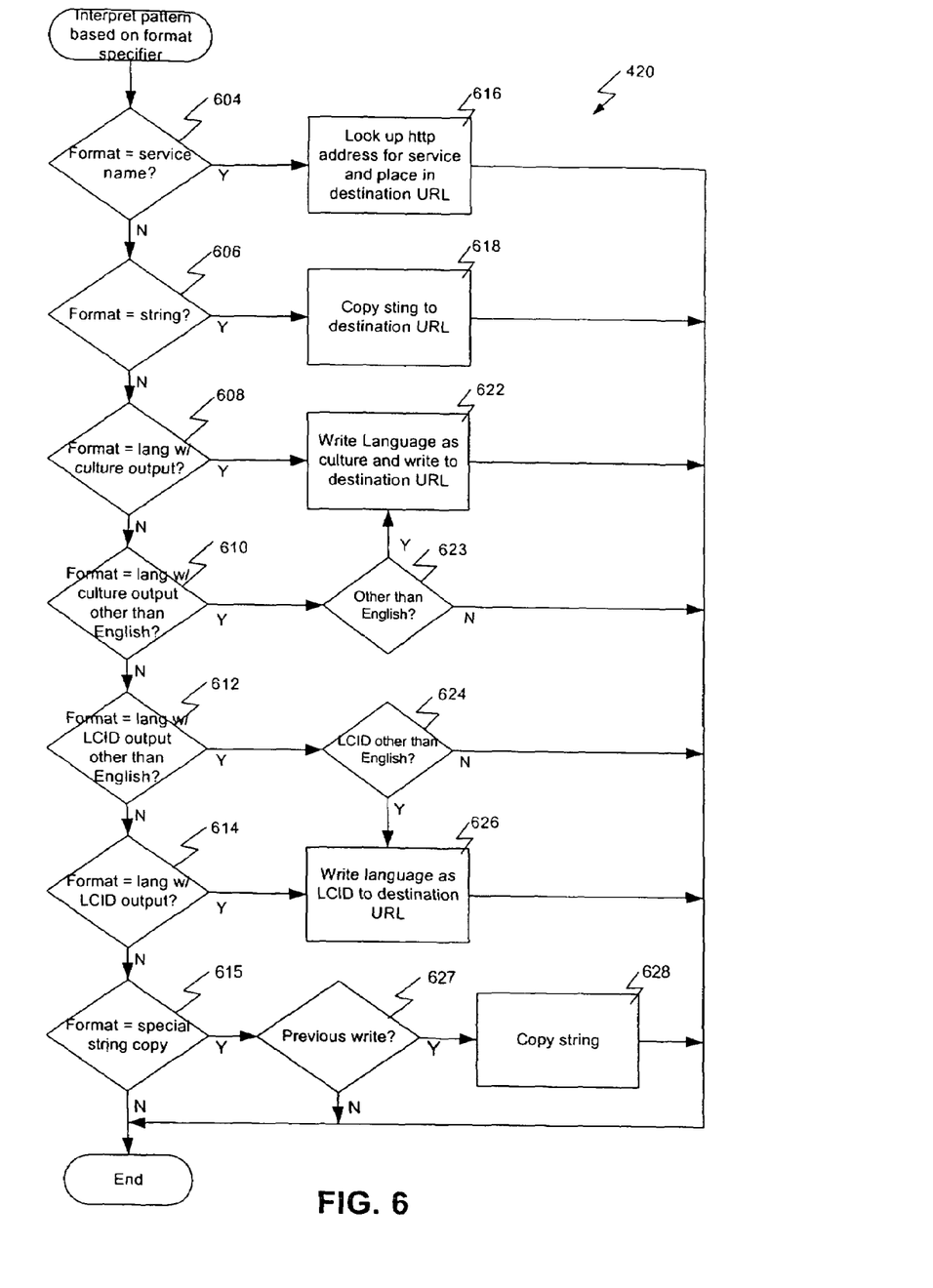
FIG. 6 illustrates interpreting a pattern from a patterned URL based on a format specifier according to one embodiment of the present invention.

FIG. 6 illustrates interpreting a pattern based on a format specifier according to one embodiment of the present invention. As will be discussed below, the format specifier may be any of a variety of predetermined characters or symbols that the redirector will recognize. Examples of possible format specifiers are listed below for illustrative purposes only. Other symbols or characters may be used for the various formats. Additionally, further specifiers may be added in other embodiments. Some examples of possible format specifiers and their meanings include:

| | |
|---|---|
| OH | Indicates the name of a service such as help. The redirector looks up the http address of the service and places it into the destination URL. |

-continued

| | |
|---|---|
| S | Indicates string data. The redirector copies the data as a string from request URL to the destination URL. |
| LC | Indicates input from the request URL is a language and output to the destination URL should be a culture. |
| LCe | Indicates that input from the request URL is a language and output to the destination URL should be a culture, except for English, in which case nothing is output to the destination URL. |
| Le | Indicates that input from the request URL is a language and output to the destination URL should be a language, except for English, in which nothing is output to the destination URL. |
| L | Indicates that input from the request URL is a language and output to the destination URL should be an LCID number. |

The process illustrated in FIG. 6 includes a series of query operations 604, 606, 608, 610, 612, and 614. These query operations 604, 606, 608, 610, 612, and 614 cause control to branch depending upon the format specifier. First, query operation 604 makes a determination as to whether the format specifier indicates a name of a service. For example, a service may indicate a help site that has a specific URL. If, at query operation 604 a determination is made that the format specifier indicates a service name, control passes to look up operation 616. Look up operation 616 comprises looking up a Hyper-Text Transfer Protocol (HTTP) address for the service and writing the address into the destination URL. If, at query operation 604, the format specifier does not indicate a service name, control passes to query operation 606.

At query operation 606, a determination is made as to whether the format specifier indicates string data. If, at query operation 606 a determination is made that the format specifier indicates string data, control passes to copy operation 618. Optionally, a string format may be considered a default format. That is, if no format specifier is indicated, the format may be considered to be a string by default. Copy operation 618 comprises copying the string data from the request URL into the destination URL.

If, at query operation 606, the format specifier does not indicate string data, control passes to query operation 608. At query operation 608, a determination is made as to whether the format specifier indicates a language input and a culture output such as a .NET culture. That is, the request URL may indicate a language as, for example, a Language Culture Identifier (LCID) number such as 1041 while the destination accepts a culture such as ja-jp indicating Japanese. If, at query operation 608 a determination is made that the format specifier indicates a language input and a culture output, control passes to rewrite operation 622. Rewrite operation 622 comprises rewriting the language as a corresponding culture and adding the culture to the destination URL. If, at query operation 608, the format specifier does not indicate a language input and a culture output, control passes to query operation 610.

At query operation 610, a determination is made as to whether the format specifier indicates a language input and a culture output other than English. That is, the patterned URL may indicate language, for example, as an LCID such as 1033 and the output in the destination URL should be a culture such as en-us indicating U.S. English. However, in some cases, en-us may be a default and not needed in the destination URL. Therefore, at query operation 610, a determination is made that the format specifier indicates a language input and a culture output other than English, control passes to query operation 623. Query operation 623 comprises determining whether the language is other than English. If a determination is made at query operation 623 that the language is other than English, control passes to rewrite operation 622. Rewrite operation 622 comprises rewriting the language as a corresponding culture and adding the culture to the destination URL. If, however, a determination is made at query operation 623 that the language is English, no further processing is performed.

If, at query operation 610, the format specifier does not indicate a language input and a culture output other than English, control passes to query operation 612. At query operation 612 a determination is made as to whether the format specifier indicates an input with an LCID output other than English. That is, in some cases, English (1033) may be a default and not needed in the destination URL. Therefore, at query operation 612, if a determination is made that the format specifier indicates a language input and an LCID output, control passes to query operation 624. Query operation 624 comprises determining whether the LCID output is an LCID other than English. If a determination is at query operation 623 that the LCID is other than English, control passes to write operation 626. Write operation 626 comprises translating the language to a corresponding LCID and writing the LCID to the destination URL.

If, at query operation 612, a determination is made that the format is not a language with an LCID output other than English, control passes to query operation 614. At query operation 614, a determination is made as to whether the format specifier indicates a language input with an LCID output. If, at query operation 614 a determination is made that the format specifier indicates a language input with an LCID output, control passes to write operation 626. Write operation 626 comprises translating the language to a corresponding LCID and writing the LCID to the destination URL.

Finally, an optional special string copy may be used. This special string copy may be identified by a pattern character such as ? for example. Regardless of the character used, a special string copy is interpreted to cause copying of a following string in the patterned URL to the destination URL only if a previous portion of the patterned URL caused data to be written to the destination URL. For example, a path separator (/) prior to the name of a subdirectory indicating a language may not be appropriate if the language is English as discussed. Therefore, the patterned URL may indicate in part ?/ meaning copy the path separator (/) as a string to the destination URL only if a previous portion of the pattern caused data (such as an LCID or culture) to be added to the destination URL.

Therefore, at query operation 615, a determination is made as to whether a special string copy is indicated. If, at query operation 615, a special string copy is indicated, control passes to query operation 627. Query operation 627 determines whether a previous portion of the patterned URL caused data to be written to the destination URL. If, at query operation 627 a determination is made that a previous portion of the patterned URL causes data to be written to the destination URL, control passes to copy operation 628. Copy operation 628 comprises copying a string following the special string copy character (such as ?) to the destination URL.

In summary, a format specifier from a pattern of a patterned URL can indicate conditional formatting based on input data provided by the request URL. For example, as seen above, a format specifier may indicate that data should be added to the destination URL only if the language specified by the request URL is not English. This is particularly useful in the case a patterned URL relates to the destination URLs for several different languages and the non-English languages are stored in sub-directories on the website but English is not.

Using the example format specifiers and data source types listed above and the algorithm outlined in FIGS. 3-6, the following example further illustrates generating a destination URL using a patterned URL and a request URL. In this example there are different paths for different languages as previously discussed. A request URL may be:

http://r.office.net/r/rlidTOW?WebLang=1041.

The redirect looks up a corresponding patterned URL that may be:

http://office.microsoft.com/[LCe=WebLang][/?]home.aspx

Since the format specifier (LCe=WebLang) of the patterned URL indicates the input from the request URL is an LCID (1041) and the output to the destination should be a culture, except for English, and the data source type (?) indicates the redirector should copy the rest of the section as a string if the indicator wrote anything to the destination URL, the destination URL would be:

http://office.microsoft.com/ja-jp/home.aspx

In a similar example, the request URL may indicate an LCID for English such as:

http://r.office.net/r/rlidTOW?WebLang=1033.

This request URL may be related to the same patterned URL:

http://office.microsoft.com/[LCe=WebLang][/?]home.aspx

The redirector, given this request URL and patterned URL would then generate a destination URL:

http://office.microsoft.com/home.aspx

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of redirecting a request URL, the request URL including data related to a patterned URL, the method comprising:

receiving the request Uniform Resource Locator (URL) from a user system;

determining the patterned URL based on the data related to the patterned URL from the request URL;

determining whether a character from the patterned URL indicates a pattern that indicates a data source type, wherein the data source type indicates a location of data for generating a destination URL;

when the character from the patterned URL indicates a pattern that indicates a data source type, interpreting a format specifier associated with the patterned URL, wherein the format specifier indicates conditional formatting for the destination URL, generating a destination URL having data from the location indicated by the data source type, wherein the data is formatted based on the format specifier of the patterned URL, and sending the destination URL having data from the location indicated by the data source type to the user system for redirecting the user system;

when the character from the patterned URL does not indicate a pattern that indicates a data source type, generating a destination URL having the character copied from the patterned URL, and sending the destination URL having the character copied from the patterned URL to the user system.

2. The method of claim 1, wherein interpreting the format specifier comprises looking up an Hyper-Text Transfer Protocol (HTTP) address for a service and placing the address into the destination URL when the format specifier indicates the name of the service.

3. The method of claim 1, wherein interpreting the format specifier comprises copying string data into the destination URL when the format specifier indicates the string data.

4. The method of claim 1, wherein interpreting the format specifier comprises rewriting a language as a corresponding culture and adding the culture to the destination URL when the format specifier indicates the language.

5. The method of claim 1, wherein interpreting the format specifier comprises rewriting a language as a corresponding culture and adding the culture to the destination URL when the language indicates other than English and when the format specifier indicates the language.

6. The method of claim 1, wherein interpreting the format specifier comprises copying a language to the destination URL when the language indicates other than English and when the format specifier indicates the language.

7. The method of claim 1, wherein interpreting the format specifier comprises translating a culture to a Language Culture IDentifier (LCID) and placing the LCID into the destination URL when the format specifier indicates the culture.

8. The method of claim 1, wherein interpreting the format specifier comprises copying a following string to the destination URL when a previous portion of the patterned URL caused data to be written to the destination URL and when the format specifier indicates a special string copy.

9. The method of claim 1, wherein generating a destination URL having data from the location indicated by the data source type comprises copying a path part from the request URL to the destination URL when the data source type indicates that data is located in a path portion of the request URL.

10. The method of claim 1, wherein generating a destination URL having data from the location indicated by the data source type comprises copying data from a query string of the request URL to the destination URL when the data source type indicates that data is located in the query string of the request URL.

11. The method of claim 1, wherein generating a destination URL having data from the location indicated by the data source type comprises copying a data source identifier from the patterned URL to the destination URL when the data source type indicates that data is located in the data source identifier of the patterned URL.

12. The method of claim 9, wherein the path portion is identified by a data source identifier in the pattern.

13. The method of claim 10, wherein the query string is identified by a data source identifier in the pattern.

14. A system comprising:

a processor; and a memory coupled with and readable by the processor and having stored therein instructions which, when executed by the processor, cause the processor to:

receive a request Uniform Resource Locator (URL) from a user system;

determine a patterned URL based on the request URL;

identify a character from the patterned URL that indicates a pattern that indicates a data source type, wherein the data source type identifies a location of data for generating a destination URL;

interpret a format specifier associated with the patterned URL, wherein the format specifier indicates conditional formatting for the destination URL;

generate the destination URL having data from the location indicated by the data source type, wherein the data is formatted based on the format specifier of the patterned URL; and sending the destination URL to the user system for redirecting the user system.

15. The system of claim 14, further comprising looking up an Hyper-Text Transfer Protocol (HTTP) address for a service and placing the address into the destination URL when the format specifier indicates a name of the service.

16. The system of claim 14, further comprising copying string data into the destination URL when the format specifier indicates the string data.

17. The system of claim 14, further comprising rewriting a language as a corresponding culture and adding the culture to the destination URL when the format specifier indicates the language.

18. The system of claim 14, further comprising rewriting a language as a corresponding culture and adding the culture to the destination URL when the language indicates other than English and when the format specifier indicates the language.

19. The system of claim 14, further comprising copying a language to the destination URL when the language indicates other than English and when the format specifier indicates the language.

20. The system of claim 14, translating a culture to a corresponding Language Culture IDentifier (LCID) and placing the LCID into the destination URL when the format specifier indicates the culture.

21. The system of claim 14, further comprising copying a following string to the destination URL when a previous portion of the patterned URL caused data to be written to the destination URL and when the format specifier indicates a special string copy.

22. The system of claim 14, further comprising copying a path part from the request URL to the destination URL when the data source type indicates that data is located in a path portion of the request URL.

23. The system of claim 14, further comprising copying data from the query string of the request URL to the destination URL when the data source type indicates that data is located in a query string of the request URL.

24. The system of claim 14, further comprising copying a data source identifier from the patterned URL to the destination URL when the data source type indicates that data is located in a data source identifier of the patterned URL.

25. The system of claim 22, wherein the path part is identified by a data source identifier in the pattern.

26. The system of claim 23, wherein the query string is identified by a data source identifier in the pattern.

27. A computer-readable storage medium encoding a computer program of instructions for executing a computer process for redirecting a request URL, the computer process comprising:

receiving the request Uniform Resource Locator (URL) from a user system;

generating a patterned URL based on the request URL;

identifying a character from the patterned URL that indicates a pattern that indicates a data source type, wherein the data source type identifies a location of data for generating a destination URL;

interpreting a format specifier associated with the patterned URL, wherein the format specifier indicates conditional formatting for the destination URL;

generating the destination URL having data from the location indicated by the data source type, wherein the data is formatted based on the format specifier of the patterned URL; and sending the destination URL to the user system for redirecting the user system.

28. The computer-readable storage medium of claim 27, further comprising looking up an Hyper-Text Transfer Protocol (HTTP) address for a service and placing the address into the destination URL when the format specifier indicates a name of the service.

29. The computer-readable storage medium of claim 27, further comprising copying string data into the destination URL when the format specifier indicates string data.

30. The computer-readable storage medium of claim 27, further comprising rewriting a language as a corresponding culture and adding the culture to the destination URL when the format specifier indicates the language.

31. The computer-readable storage medium of claim 27, further comprising rewriting a language as a corresponding culture and adding the culture to the destination URL when the language indicates other than English and when the format specifier indicates the language.

32. The computer-readable storage medium of claim 27, further comprising copying the language to the destination URL when the language indicates other than English and when the format specifier indicates the language.

33. The computer-readable storage medium of claim 27, further comprising translating a culture to a Language Culture IDentifier (LCID) and placing the LCID into the destination URL when the format specifier indicates the culture.

34. The computer-readable storage medium of claim 27, further comprising copying a following string to the destination URL when a previous portion of the patterned URL caused data to be written to the destination URL and when the format specifier indicates a special string copy.

35. The computer-readable storage medium of claim 27, further comprising copying a path part from the request URL to the destination URL when the data source type indicates that data is location in a path portion of the request URL.

36. The computer-readable storage medium of claim 27, further comprising copying data from a query string of the request URL to the destination URL when the data source type indicates that data is located in the query string of the request URL.

37. The computer-readable storage medium of claim 27, further comprising copying the data source identifier from the patterned URL to the destination URL when the data source type indicates that data is located in a data source identifier of the patterned URL.

38. The computer-readable storage medium of claim 35, wherein the path part is identified by a data source identifier in the pattern.

39. The computer-readable storage medium of claim 36, wherein the query string is identified by a data source identifier in the pattern.

* * * * *

UNITED STATES PATENT AND TRADEMARK OFFICE
CERTIFICATE OF CORRECTION

| | | |
|---|---|---|
| PATENT NO. | : 7,376,650 B1 | Page 1 of 1 |
| APPLICATION NO. | : 10/660899 | |
| DATED | : May 20, 2008 | |
| INVENTOR(S) | : Matthew Ruhlen et al. | |

It is certified that error appears in the above-identified patent and that said Letters Patent is hereby corrected as shown below:

In column 5, line 7, after "data" insert -- . --.

In column 5, line 8, delete "ULR" and insert -- URL --, therefor.

In column 5, line 9, delete "162" and insert -- 162, --, therefor.

Signed and Sealed this

Twenty-second Day of February, 2011

David J. Kappos
*Director of the United States Patent and Trademark Office*